United States Patent
Sakai et al.

(10) Patent No.: US 7,755,777 B2
(45) Date of Patent: Jul. 13, 2010

(54) WAVELENGTH SELECTION METHOD, FILM THICKNESS MEASUREMENT METHOD, FILM THICKNESS MEASUREMENT APPARATUS, AND SYSTEM FOR PRODUCING THIN FILM SILICON DEVICE

(75) Inventors: Satoshi Sakai, Kanagawa (JP); Masami Iida, Nagasaki (JP); Kohei Kawazoe, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/517,122

(22) PCT Filed: Oct. 31, 2007

(86) PCT No.: PCT/JP2007/071179

§ 371 (c)(1),
(2), (4) Date: Jun. 1, 2009

(87) PCT Pub. No.: WO2008/102485

PCT Pub. Date: Aug. 28, 2008

(65) Prior Publication Data

US 2010/0033735 A1 Feb. 11, 2010

(30) Foreign Application Priority Data

Feb. 20, 2007 (JP) .............................. 2007-039594

(51) Int. Cl.
*G01B 11/06* (2006.01)
(52) U.S. Cl. ...................................... 356/632; 356/429
(58) Field of Classification Search ......... 356/429–431, 356/632, 657
See application file for complete search history.

(56) References Cited

U.S. PATENT DOCUMENTS 6,495,234 B2   12/2002  Usami
2002/0027665 A1 *  3/2002  Abe et al. ................... 356/630

FOREIGN PATENT DOCUMENTS

| JP | 6174448 A | 6/1994 |
| JP | 2001176136 A | 6/2001 |
| JP | 2003065727 A | 3/2003 |
| JP | 2003075126 A | 3/2003 |

OTHER PUBLICATIONS

ISR for PCT/JP2007/071179 dated Dec. 25, 2007.

* cited by examiner

*Primary Examiner*—Tarifur Chowdhury
*Assistant Examiner*—Tara S Pajoohi
(74) *Attorney, Agent, or Firm*—Kanesaka Berner and Partnership LLP (57) ABSTRACT

An object is to reduce film thickness measurement error. Illumination light having different wavelengths is radiated onto a plurality of samples in which thin films having different film qualities and film thicknesses are provided on substrates, evaluation values related to the amounts of transmitted light when the illumination light of each wavelength is radiated are measured, film thickness characteristics, showing the relationship between the evaluation values and the film thicknesses for each film quality, are formed at each wavelength based on the measurement results, and among the film thickness characteristics, a wavelength at which a measurement difference between the evaluation values caused by the film qualities is in a predetermined range is selected.

14 Claims, 5 Drawing Sheets

WAVELENGTH SELECTION METHOD, FILM THICKNESS MEASUREMENT METHOD, FILM THICKNESS MEASUREMENT APPARATUS, AND SYSTEM FOR PRODUCING THIN FILM SILICON DEVICE

RELATED APPLICATIONS

The present application is based on International Application Number PCT/JP2007/071179 filed Oct. 31, 2007, and claims priority from Japanese Application Number 2007-039594 filed Feb. 20, 2007, the disclosures of which are hereby incorporated by reference herein in their entirety.

TECHNICAL FIELD

The present invention relates to film thickness measurement of a thin film, and more particularly relates to a wavelength selection method for selecting a wavelength to be used for film thickness measurement of a thin film including a crystalline silicon film formed on a substrate of a thin film silicon device, to a film thickness measurement method for performing film thickness measurement using a wavelength selected by the above wavelength selection method, to an apparatus for the film thickness measurement method, and to a system for producing a thin film silicon device including a thin-film formation process.

BACKGROUND ART

Heretofore, a technique for measuring the thickness of a thin film formed on a light-transmissive substrate by using optical absorption characteristics of a material has been known (for example, see Patent Document 1).

Patent Document 1 discloses a technique in which, in a production line of thin film solar cells, light is radiated to a substrate of a solar cell provided with a thin film, and the thickness thereof is obtained from the amount of light transmitted through the substrate.

Patent Document 1: Japanese Unexamined Patent Application Publication No. 2003-65727

DISCLOSURE OF INVENTION

However, in the film thickness measurement disclosed in Patent Document 1, it was found that, when evaluating the thicknesses of thin films which are formed on different substrates or which have different surface irregularities, variations occur in the amount of transmitted light, and the measurement result may in some cases contain a measurement error larger than an acceptable range. In addition, due to this error, there has been a problem in that the thickness cannot be measured with the desired accuracy, and as a result, film-thickness monitoring accuracy cannot be improved.

In addition, when a film thickness meter exclusively used for thin-film thickness measurement (such as a spectral ellipsometer or a spectrophotometer) is used, a substrate in a production line must be temporarily removed for measurement and evaluation, and it takes time to obtain measurement results; hence, there has been a problem in that all products cannot be monitored online during production.

The present invention has been conceived in order to solve the problems described above, and an object of the present invention is to provide a wavelength selection method that can reduce film thickness measurement error, a film thickness measurement method, a film thickness measurement apparatus, and a system for producing a thin film silicon device.

A first aspect of the present invention is a wavelength selection method for selecting a wavelength to be used for film thickness measurement of a thin film, comprising: radiating illumination light having different wavelengths onto a plurality of samples in which thin films having different film qualities and film thicknesses are formed on substrates; measuring evaluation values related to the amounts of transmitted light when the illumination light of each wavelength is radiated; based on the measurement results, forming film thickness characteristics showing the relationship between the evaluation values and the film thicknesses for each film quality at each wavelength; and among the film thickness characteristics, selecting a wavelength at which a measurement difference between the evaluation values due to the film qualities is within a predetermined range.

For example, in a thin film silicon solar cell in which a transparent conductive film, at least one silicon thin film photoelectric conversion layer, and a metal electrode are laminated on a transparent substrate, it was found that since an irregular structure (texture structure) is provided on the surface of the transparent conductive film to effectively use incident light in the photoelectric conversion layer, the film quality of a thin film grown on the irregular structure will be influenced thereby, thus precluding an improvement in measurement accuracy of the film thickness of the silicon thin film photoelectric conversion layer in some cases.

The inventors of the present invention found that when the film quality of the thin film of the silicon film photoelectric conversion layer, in particular, the film quality of a crystalline silicon film, is varied, the transmittance is also varied, and as a result, film thickness measurement error is caused, and hence, the following method for reducing a measurement error caused by the film quality was invented.

That is, in the wavelength selection method according to the first aspect of the present invention, a plurality of samples in which thin films having different film qualities and thicknesses are formed on substrates is prepared and is irradiated with illumination light having different wavelengths, transmitted light transmitted through the samples when the illumination light having different wavelengths are radiated are detected, and evaluation values related to the amounts of the transmitted light are measured. Subsequently, based on the measurement results, film thickness characteristics showing the relationship between the evaluation values and the film thicknesses for each film quality are formed at each wavelength, and a wavelength at which the measurement difference between the evaluation values caused by the film qualities is within a predetermined range is selected among the film thickness characteristics; hence, a wavelength at which the measurement error caused by the film qualities is small can be selected.

In addition, when the film thickness is measured based on the evaluation value related to this selected wavelength, the measurement error can be reduced. As disclosed in Patent Document 1, heretofore, a wavelength similar to an absorption wavelength of each thin film is selected, and the film thickness is calculated by conversion from the transmitted light intensity; however, according to the present invention, it was found that selection of a wavelength at which the measurement error caused by the film quality is small is very important in improving the measurement accuracy. In the present invention, the evaluation value related to the amount of transmitted light is, for example, the light intensity or the transmittance.

In addition, when the illumination light having different wavelengths is radiated to a thin film, the above evaluation values may be obtained such that light having different single-wavelengths is sequentially radiated, and the transmitted light of each light radiation is detected, or the evaluation values at individual wavelengths may be obtained such that white light including a plurality of wavelengths is radiated, and the transmitted light is detected and is further spectroscopically analyzed. Alternatively, the evaluation values may be obtained such that dispersed illumination light is radiated, and the transmitted light thereof is detected. In addition, the illumination light may be radiated from the transparent substrate side or the thin film side; however, since minute irregularities are present on the thin film surface, and thereby the illumination light may be scattered in some cases, the illumination light is preferably radiated from the transparent substrate side since the amount of light transmitted through the film is stabilized.

In the wavelength selection method described above, the film quality includes, for example, the crystallinity.

With this method, the measurement error caused by the crystallinity can be reduced. The crystallinity can be evaluated, for example, by a Raman peak intensity ratio. The Raman peak intensity ratio is a ratio of the intensity $I_{520}$ of a Raman peak (wavelength of approximately 520 cm$^{-1}$) indicating a crystal state to a Raman peak $I_{480}$ (wavelength of approximately 480 cm$^{-1}$) indicating an amorphous state, and as the Raman peak intensity ratio is increased, the crystallinity is considered to be higher.

"Illumination light including a wavelength selected by the above wavelength selection method" includes, as a concept, light having a wavelength selected by the wavelength selection method, that is, illumination light having a single wavelength.

In the above wavelength selection method, the film quality includes, for example, surface irregularity of the thin film.

Accordingly, the measurement error caused by the surface irregularity of the thin film can be reduced. The degree of the surface irregularity can be evaluated using a haze ratio of the transparent conductive film or a haze ratio of the crystalline silicon film. The haze ratio is defined by the following equation: diffused transmitted light/total transmitted light.

A second aspect of the present invention is a film thickness measurement method comprising: radiating illumination light including a wavelength selected by the wavelength selection method described above onto a substrate which is provided with a thin film and which is transported in a production line including a thin-film formation process; detecting light transmitted through the substrate; measuring the evaluation value at the wavelength based on the intensity of the detected light; and obtaining the film thickness corresponding to the measured evaluation value using a film thickness characteristic at the wavelength in which evaluation values and film thicknesses are related to each other in advance.

According to the film thickness measurement method described above, the measurement accuracy of the film thickness of a thin film transported in a production line including a thin-film formation process can be improved. In particular, illumination light including light having a wavelength at which the measurement error caused by the film quality of a crystalline silicon film is small is radiated, for example, onto a solar cell substrate on which a thin film (in particular, a crystalline silicon film) is formed and which is transported in a solar cell production line, light transmitted through this substrate is detected, the evaluation value (such as the transmittance or light intensity) at the wavelength is then measured based on this transmitted light, and the film thickness is obtained based on this measurement result; hence, the measurement accuracy can be improved.

In the film thickness measurement method, the measured film thickness may be corrected based on a haze ratio which is independently obtained in a different way.

According to the film thickness measurement method described above, since the measured film thickness is corrected based on the haze ratio, which is the evaluation value related to the surface irregularity of a thin film, in particular, a crystalline silicon film, the measurement accuracy can be further improved.

A third aspect of the present invention is a film thickness measurement apparatus comprising: a light radiation unit radiating illumination light including a wavelength selected by the wavelength selection method described above onto a substrate which is provided with a thin film and which is transported in a production line including a thin-film formation process; a light detection unit detecting light transmitted through the substrate; an evaluation value measurement unit measuring the evaluation value at the wavelength based on the intensity of the detected light; and a film thickness measurement unit obtaining a film thickness corresponding to the measured evaluation value using a film thickness characteristic at the wavelength in which evaluation values and film thicknesses are related to each other in advance.

By the film thickness measurement apparatus described above, after illumination light including a wavelength at which the measurement error caused by the film quality of a thin film, in particular, a crystalline silicon film, is small is radiated, for example, onto a substrate, such as a solar cell substrate, which is provided with a thin film, in particular, a crystalline silicon film, light transmitted through this substrate is detected, the evaluation value (such as the transmittance or light intensity) at the wavelength is then measured based on this transmitted light, and the film thickness is obtained based on this measurement result; hence, the measurement accuracy can be improved.

It is preferable that the film thickness measurement apparatus be provided in a production line of a production system including a thin-film formation process and be used for monitoring a thin-film formation status.

In addition, a fourth aspect of the present invention is a thin film silicon device produced using the film thickness measurement apparatus described above. A fifth aspect of the present invention is a thin film silicon device produced using the film thickness measurement method described above. The thin film silicon device includes, for example, a thin film silicon solar cell.

In addition, the various aspects described above may be used in combination whenever applicable.

In addition, in a thin film silicon solar cell, which is a thin film silicon device, in order to improve the power generation efficiency, it is important to uniformly and homogeneously form a thin film on a large substrate having a side length of 1 m or more. Example structures of a solar cell including a thin film (in particular, crystalline silicon film) include a crystalline silicon single solar cell, a tandem solar cell, and a triple solar cell. In the tandem solar cell, a crystalline silicon film may be used in a bottom cell. In the triple solar cell, a crystalline silicon film may be used in a middle cell and a bottom cell.

The film thickness measurement method and the film thickness measurement apparatus of the present invention are each preferably used for the film thickness measurement of a crystalline silicon film as described above or a thin film including a crystalline silicon film.

Silicon is a collective term including silicon (Si), silicon carbide (SiC), and silicon germanium (SiGe), and crystalline silicon indicates silicon other than amorphous silicon, that is, silicon other than noncrystalline silicon, and includes crystalline and polycrystalline silicon. In addition, thin film silicon includes amorphous silicon, crystalline silicon, and multi-junction-type silicon (tandem and/or triple structure) in which amorphous silicon and crystalline silicon are laminated to each other.

The present invention is effective in reducing the film thickness measurement error. In addition, since the variation in film thickness can be monitored, the present invention is effective in improving the power generation efficiency, yield, and production efficiency.

EXPLANATION OF REFERENCE SIGNS

1: transport conveyor
2: light receiving device
3: light emitting device
4: light source power supply
5: photoelectric switch
6: rotary encoder
7: computer
8: display device
W: substrate

BEST MODE FOR CARRYING OUT THE INVENTION

Hereinafter, a wavelength selection method, a film thickness measurement method, a film thickness measurement apparatus, and a production system of thin film silicon device according to embodiments of the present invention will be described with reference to the accompanying drawings.

The film thickness measurement apparatus of this embodiment is provided for use in part of a production line of a production system of a thin film silicon device, in particular, a thin film silicon solar cell, and is preferably used for film thickness measurement of a thin film, in particular, a crystalline silicon film, formed on a substrate of a solar cell. In addition, the film thickness measurement apparatus of each embodiment is designed to be widely used in a production system for producing a solar cell including a crystalline silicon layer, regardless of the structure of the solar cell, such as a single solar cell having one pin-structure photoelectric conversion layer, a tandem solar cell having two pin-structure photoelectric conversion layers, a triple solar cell having three pin-structure photoelectric conversion layers, or a monolayer crystalline silicon single film provided on a light-transmissive substrate.

FIRST EMBODIMENT

Figure 1:
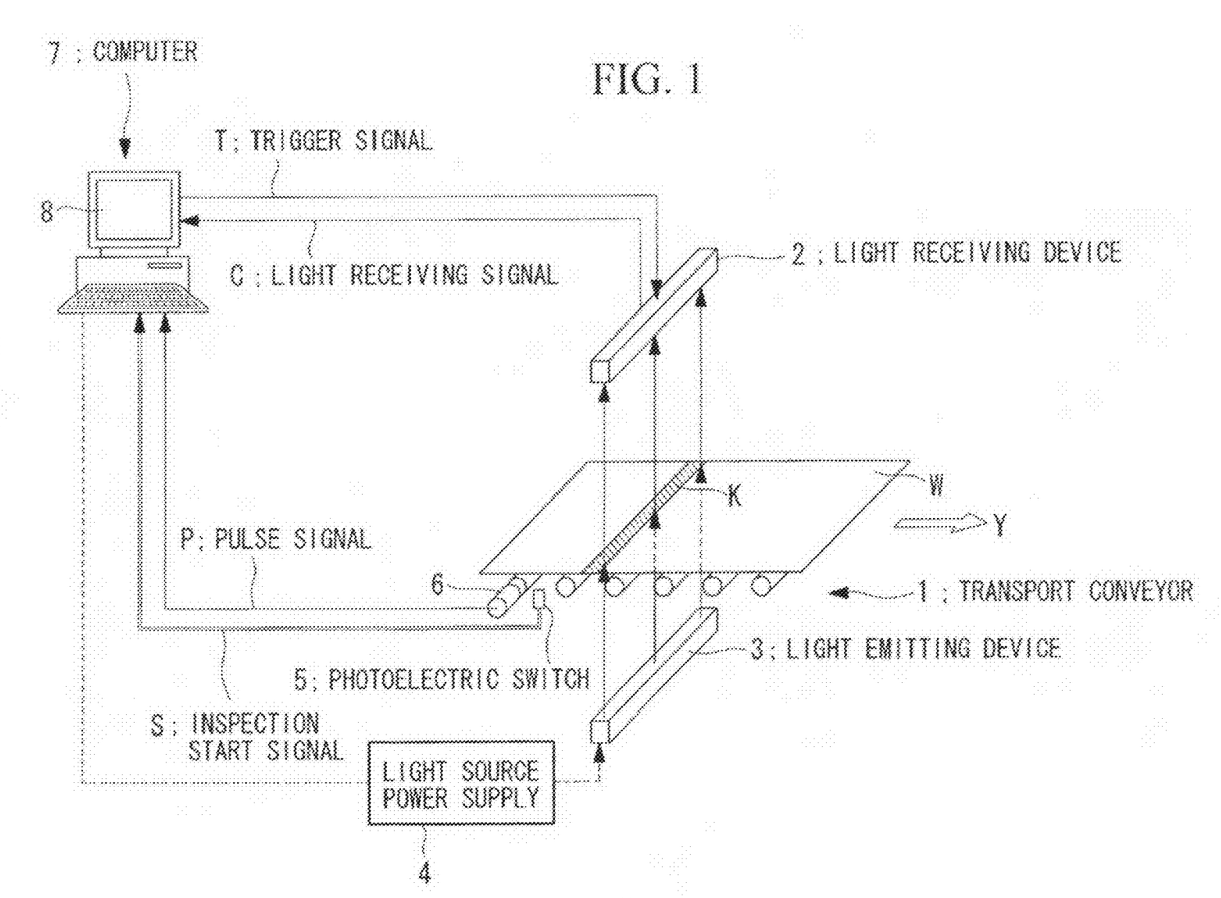
FIG. 1 is a view showing the entire structure of a thin-film thickness measurement apparatus for a substrate according to one embodiment of the present invention.

FIG. 1 is a view showing the entire structure of a thin-film thickness measurement apparatus according to the first embodiment of the present invention.

In the film thickness measurement apparatus shown in FIG. 1, a substrate W is transported in a transport direction (Y direction in the figure) by a transport conveyor 1. This substrate W is composed, for example, of a transparent conductive film formed by a thermal CVD apparatus and a crystalline silicon film photoelectric conversion layer formed by a plasma CVD apparatus, formed in that order on a transparent glass substrate. Alternatively, this substrate W is composed of a transparent conductive film formed by a thermal CVD apparatus, an amorphous silicon film photoelectric conversion layer formed by a plasma CVD apparatus, and a crystalline silicon film photoelectric conversion layer formed by a plasma CVD apparatus, formed in that order on a transparent glass substrate. Alternatively, this substrate W is composed of a microcrystalline silicon film formed by a plasma CVD apparatus on a transparent glass substrate. In FIG. 1, the transparent glass substrate is located at the transport conveyor 1 side of the substrate W, and the transparent conductive film and the thin film silicon photoelectric conversion layer are laminated in that order toward the upper side (a light receiving device 2 side in FIG. 1).

A light emitting device (light emitting unit) 3 is disposed below the transport conveyor 1, and the light receiving device (light detection unit) 2 is disposed thereabove. The light emitting device 3 is formed of a plurality of LEDs disposed in a line. In this embodiment, as the LED, for example, an LED having a single wavelength or a white LED combined with a filter may be used. In addition, besides the LED, other light sources, such as a lamp light source and a light source unit including a lamp light source and a filter in combination may also be used. A selected wavelength which will be described later is used as the wavelength of light emitted from the light emitting device 3.

In the light emitting device, light amount adjustment and ON/OFF control of each light source are performed by the operation of a light source power supply 4 based on signals sent from a computer 7 which will be described later.

Figure 2:
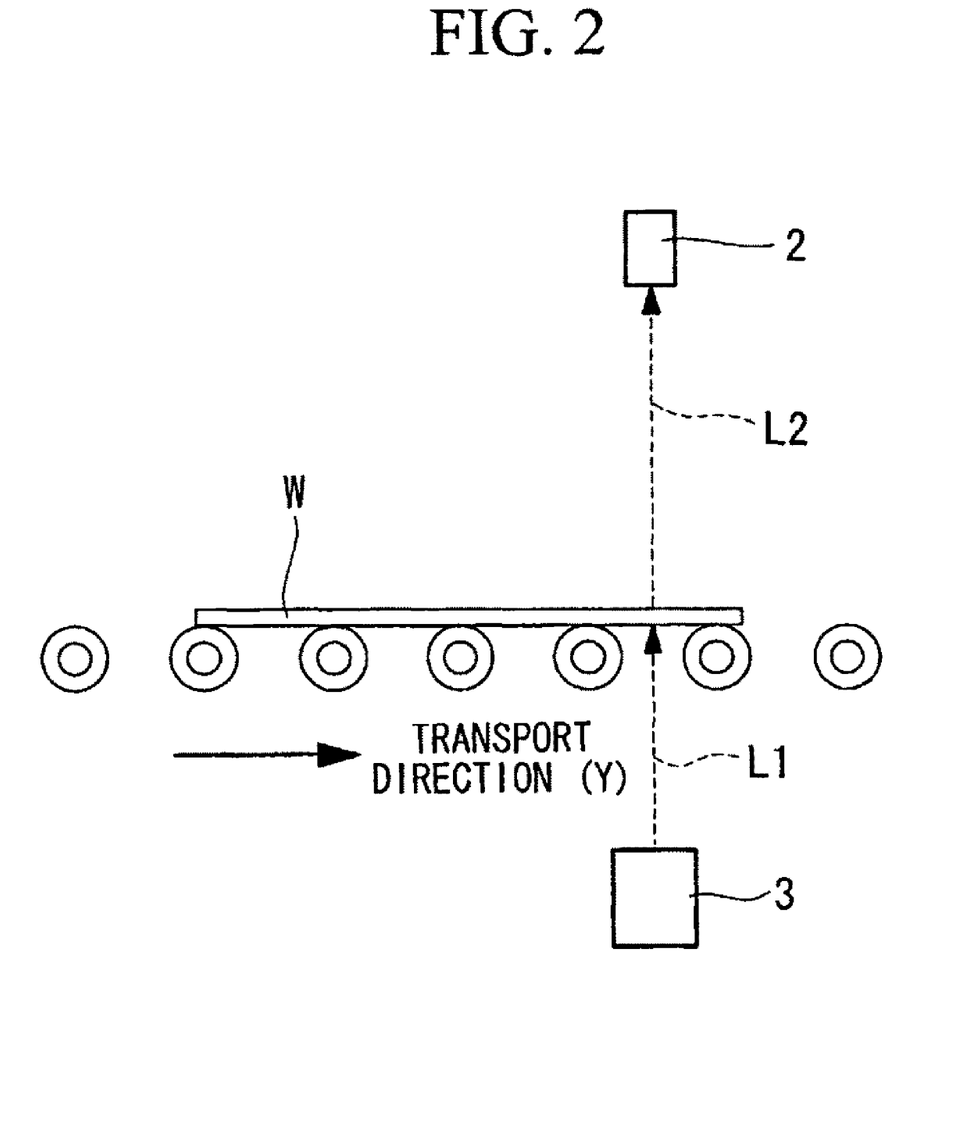
FIG. 2 is a view showing the arrangement of a light emitting device and a light receiving device.

As shown in FIGS. 1 and 2, the light receiving device 2 receives transmitted light L2, which is illumination light L1 emitted from each LED provided in the light emitting device 3 and transmitted through the substrate W. The light receiving device 2 is formed of a plurality of light receiving elements disposed in a line. The light receiving elements are disposed so as to be paired with the respective LEDs provided in the light emitting device 3, and the illumination light L1 emitted from each LED and transmitted through the substrate W is designed to be received by the corresponding light receiving element. As the light receiving element, any element may be used as long as it is sensitive to a wavelength of light to be measured; for example, a photodiode or a photomultiplier tube may be used, and the structure is simply formed at low cost. In this case, without providing the substrate W, the light receiving elements are preferably adjusted so as to have approximately uniform detection sensitivities.

In addition, when the light emitting device 3 emits white light, a light receiving element that can perform spectroscopic measurement for light wavelengths may be provided as the light receiving device 2. In this case, since the wavelength of light whose transmission amount is to be evaluated can be freely selected, selection of a test film can be easily performed.

In this embodiment, although the light emitting device 3 is disposed below the transport conveyor 1 and the light receiving device 2 is disposed thereabove, the light emitting device 3 and the light receiving device 2 may be disposed above and below the transport conveyor 1, respectively.

Since minute irregularities are present on the surface of a thin film formed on the substrate W, and the illumination light is scattered thereby, it is preferable in terms of stability of the amount of light transmitted through the film that the light emitting device 3 be disposed below the transport conveyor 1, and the illumination light be emitted from the transparent glass substrate side.

A photoelectric switch 5 and a rotary encoder 6 are disposed at the transport conveyor 1. When the photoelectric switch detects that a front end portion of the substrate W thus transported arrives at a position on which the illumination light L1 is incident, it generates an inspection start signal S and sends it to the computer 7. The rotary encoder 6 generates a pulse signal P and sends it to the computer 7 at each predetermined rotation angle, that is, each time the substrate W moves a predetermined distance.

After receiving the inspection start signal S, the computer 7 is designed to send a trigger signal T to the light receiving device 2 each time it receives the pulse signal P. Each time the light receiving device 2 receives the trigger signal T, each light receiving element of the light receiving device 2 receives the transmitted light L2 transmitted through the substrate W and sends a light receiving signal to the computer 7.

When receiving the light receiving signal from the light receiving device 2, the computer (evaluation value measurement unit and film thickness measurement unit) 7 obtains the transmittance (evaluation value related to the light amount) of light having a predetermined wavelength based on each light receiving signal, and film thickness measurement of the substrate W is performed by using this transmittance and a film thickness characteristic (calibration characteristic between the film thickness and the transmittance) prepared in advance. The film thickness is calculated according to measurement points equal in number to the number of pairs of the light emitting device 3 and the light receiving element 2 receiving the trigger signal T, and the film thicknesses in the width direction of the substrate W are sequentially calculated each time the substrate is moved to pass therethrough. The transmittance calculation and the film thickness measurement will be described later in detail.

A display device 8 such as a CRT is connected to the computer 7, and the measurement result of the film thickness, the distribution thereof, and the like are displayed on this display device 8.

Next, in the film thickness measurement apparatus shown in FIG. 1, a wavelength selection method for selecting a wavelength of light for film thickness measurement will be described. In the film thickness measurement, a measurement error is caused in accordance with the thin film quality, more particularly, in accordance with the crystallinity of a microcrystalline silicon film. Accordingly, in this embodiment, with reference to FIG. 3, there will be described a wavelength selection method for selecting a wavelength so as to reduce the measurement error caused by the crystallinity.

First, a plurality of samples coated with microcrystalline silicon films having different film thicknesses and crystallinities, which are measured and evaluated in advance by a different measurement apparatus, is prepared. In addition, the samples thus prepared preferably have an approximately identical film structure to that of the substrate W which is used in actual film thickness measurement. For example, in the thickness measurement, when the substrate W transported by the transport conveyor 1 has a structure composed of a transparent conductive film and a microcrystalline silicon film, formed in that order on a transparent glass substrate, a plurality of samples is formed such that after transparent conductive films are formed on transparent glass substrates, microcrystalline silicon films having different film thicknesses and crystallinities are formed thereon.

In addition, the thickness of the microcrystalline silicon film is varied at predetermined thickness intervals, for example, in the range from dmin to dmax, which is assumed as an actual thickness measurement range. In addition, as for the crystallinity, two types of samples, for example, having a small and a large Raman peak intensity ratio are prepared (Step SA1 in FIG. 3). In this embodiment, the Raman peak intensity ratio is an evaluation value used for evaluating the crystallinity of microcrystalline silicon and is measured, for example, by using a specialized apparatus such as a Raman spectroscopic analyzer.

The Raman peak intensity ratio is a ratio of intensity $I_{520}$ of a Raman peak indicating a crystalline state (in the vicinity of a wavelength of 520 $cm^{-1}$) to intensity $I_{480}$ of a Raman peak indicating an amorphous state (in the vicinity of a wavelength of 480 $cm^{-1}$) and can range from 0 to infinity by definition. When the Raman peak intensity ratio is 0, the state is considered to be amorphous, and the crystallinity is considered to increase as the Raman peak intensity ratio increases. In this embodiment, high and low Raman peak intensity ratios are appropriately selected in a range that can be assumed in a solar cell production process.

Subsequently, by using an apparatus performing spectroscopic measurement of transmitted light which is additionally prepared for a preliminary test, each of the samples is irradiated with white light (Step SA2 in FIG. 3), the transmitted light at that time is detected (Step SA3 in FIG. 3), and a transmission spectrum is measured from this transmitted light (Step SA4 in FIG. 3). Accordingly, the transmittances of the samples at wavelengths λ1 to λ5 are obtained. The transmittances are plotted in a coordinate system as shown in FIG. 4 in which the horizontal axis indicates the film thickness and the vertical axis indicates the transmittance, so that the film thickness characteristics related to each film quality are obtained at the wavelengths λ1 to λ5 (Step SA5 in FIG. 3).

The film thickness characteristic indicates the relationship between the transmittance and the film thickness of a microcrystalline silicon film. For the evaluation of each sample, when a film thickness measurement apparatus provided in a solar cell production line has a structure in which white light is radiated and the transmission spectrum thereof is spectroscopically measured, this film thickness measurement apparatus may be used.

Figure 4:
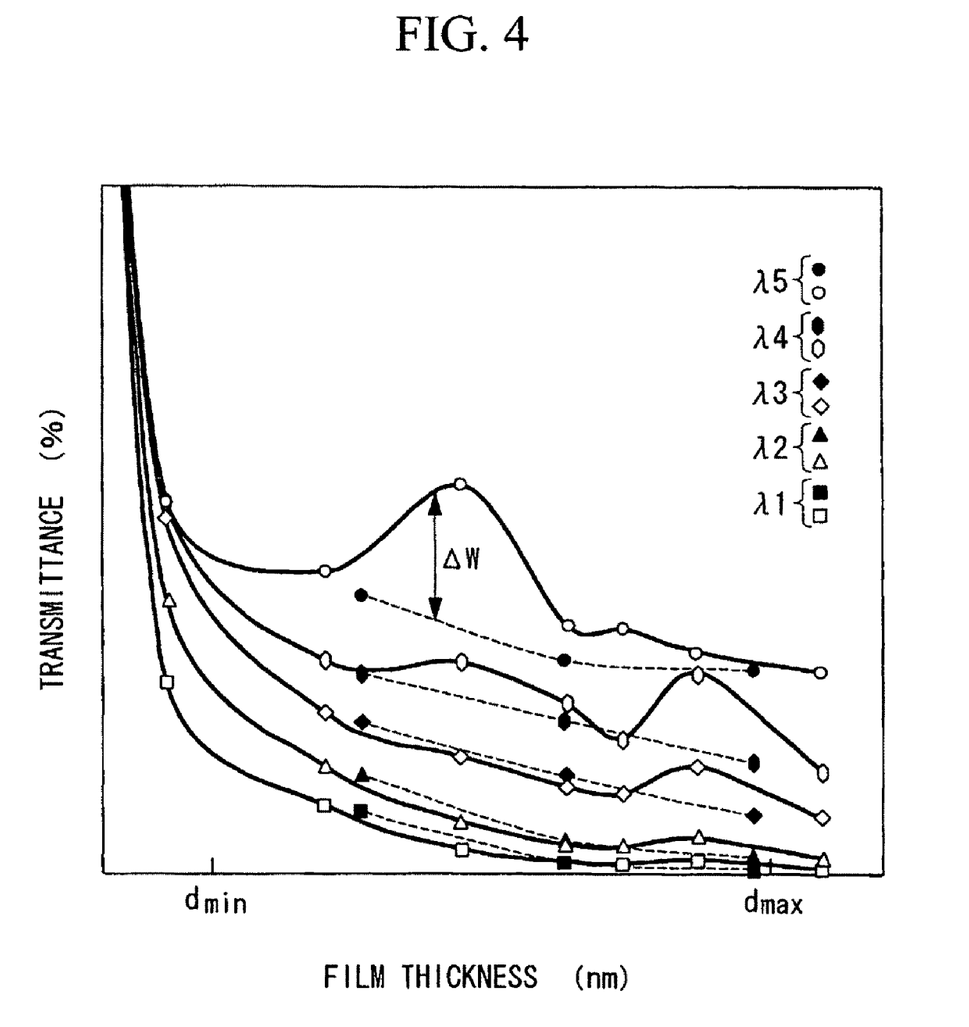
FIG. 4 is a view showing one example of film thickness characteristics at individual wavelengths when the crystallinities of thin films are different from each other.

In FIG. 4, dotted lines indicate the film thickness characteristics at the wavelengths λ1 to λ5 when the Raman peak intensity ratio is low, and solid lines indicate the film thickness characteristics at the wavelengths λ1 to λ5 when the Raman peak intensity ratio is high.

Figure 3:
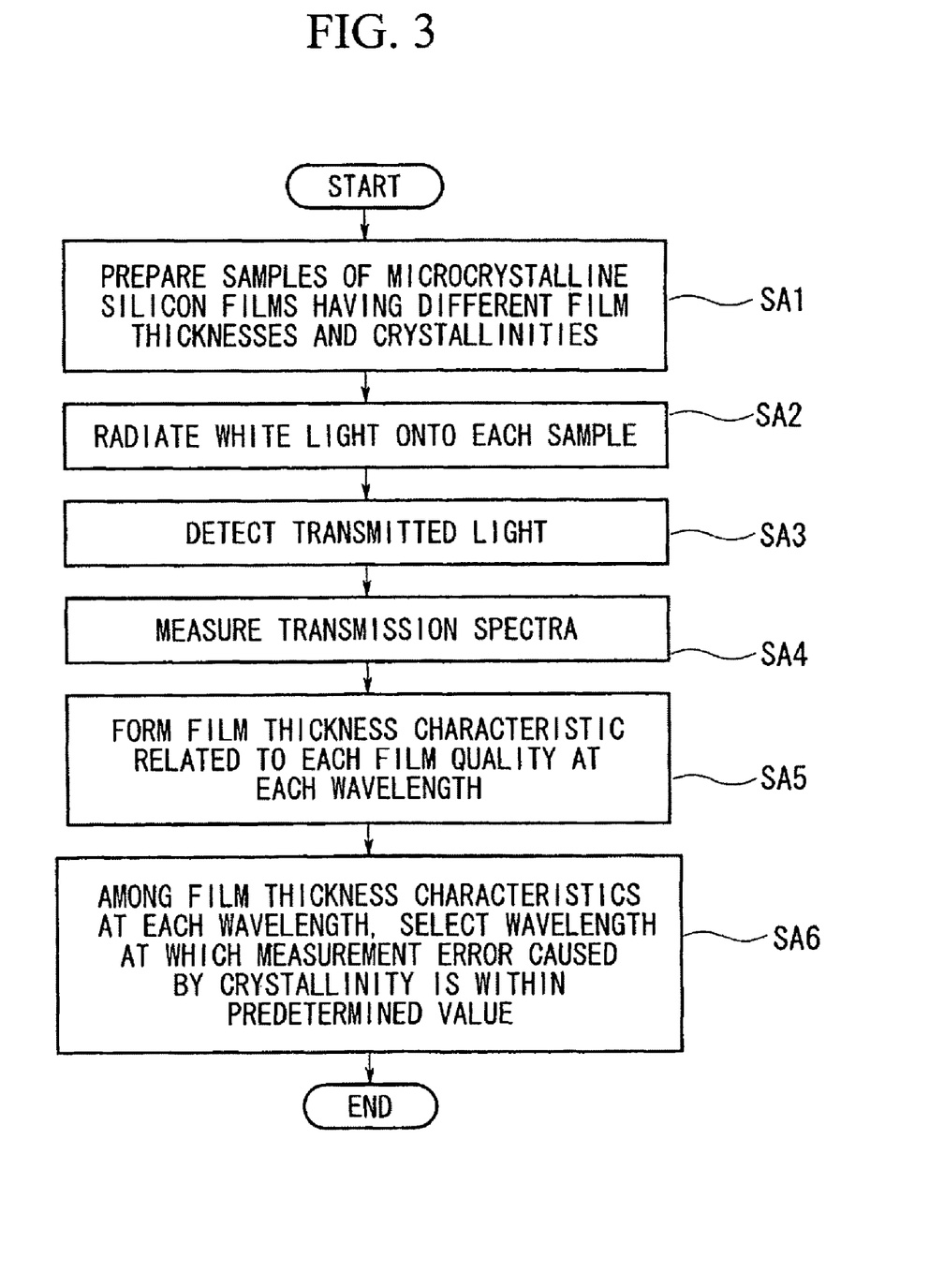
FIG. 3 is a flowchart showing a procedure of a wavelength selection method.

Next, in the film thickness range from dmin to dmax, which is assumed as an actual measurement range, among the film thickness characteristics at the wavelengths λ1 to λ5 shown in FIG. 4, a wavelength at which the film thickness characteristic does not fluctuate but gradually varies and at which a measurement difference ΔW related to the Raman peak intensity ratio is within a predetermined range is selected (Step SA6 in FIG. 3).

For example, the measurement difference ΔW (see FIG. 4) caused by the Raman peak intensity ratio at each film thickness is measured at each wavelength, and the average ΔWave of ΔW is obtained. In addition, a wavelength at which this ΔWave is within a predetermined range is extracted. As a result, a wavelength at which the dependence on the Raman peak intensity ratio is low, that is, a wavelength at which the variation in measurement value depending on the Raman peak intensity ratio is small, is extracted. In addition, when the number of extracted wavelengths is 1, this wavelength is used for film thickness measurement, and when the number of extracted wavelengths is two or more, an appropriate wavelength among those wavelengths, for example, a wavelength having the smallest average measurement difference ΔWavve, is used for the thickness measurement of a film to be measured.

Next, the case in which the film thickness is measured using the above wavelength (such as the wavelength $\lambda 1$) will be described. In this case, the film thickness characteristic in which the transmittance for the film thickness at the wavelength $\lambda 1$ is calibrated is stored in advance in a memory device (not shown) of the computer 7.

First, prior to the film thickness measurement of the substrate W, the computer 7 turns on the light emitting device 3 when the substrate W is not provided. Accordingly, the light emitted from the light emitting device 3 is received by the light receiving device 2, and a light receiving signal C is sent to the computer 7. The computer 7 measures the light intensity based on the received light receiving signal. The light intensity measured this time is a light intensity at a transmittance of 100% and is used as a standard light intensity when the transmittance of the substrate W is measured.

Next, when the light emitting device 3 is turned on, the computer 7 causes the substrate W placed on the transport conveyor 1 to be transported in a transport direction Y. Accordingly, the illumination light L1 emitted from the light emitting device 3 passes through the substrate W, for example, a transparent glass substrate, a transparent conductive film, and a microcrystalline silicon film, and is guided to the light receiving device 2 as the transmitted light L2.

In addition, as this substrate W is transported, the pulse signal P is sent to the computer 7 from the rotary encoder 6. Each time the computer 7 receives this pulse signal P, the trigger signal T is sent to the light receiving device 2. Accordingly, as the substrate W is transported, the transmitted light L2 is received by the light receiving device 2, and the light receiving signal C is then sent to the computer 7. When receiving the light receiving signal C sent from the light receiving device 2, the computer 7 obtains the light intensity at the wavelength $\lambda 1$ selected by the above wavelength selection method and calculates the transmittance by comparing this light intensity with the standard light intensity obtained in advance.

In the above embodiment, when the wavelength of illumination light is selected, the film thickness characteristics at individual wavelengths are formed in such a way that after white light having a plurality of wavelengths is radiated to the samples as the illumination light, the transmitted light thereof is received, and spectroscopic analysis is performed; however, instead of the above method, the film thickness characteristics at individual wavelengths may be formed by sequentially irradiating the samples with illumination light having different single wavelengths. For example, it is possible to select a plurality of typical evaluation wavelengths from a short wavelength (approximately 450 nm) to a long wavelength (approximately 750 nm) and to use various LEDs that emit light having the above single wavelengths, and photodiodes that are sensitive to the wavelengths of light to be measured may be used as light-receiving elements.

Subsequently, the computer 7 calculates the film thickness of the substrate W by obtaining the film thickness corresponding to this transmittance using the film thickness characteristic at the wavelength $\lambda 1$ stored in advance in the memory device. The film thickness distribution of the substrate W can be obtained by calculating the film thicknesses at the individual measurement points. In this case, the film thickness characteristic obtained when the Raman peak intensity ratio shown in FIG. 4 is high, the film thickness characteristic obtained when it is low, or the average film thickness characteristic obtained by averaging those mentioned above may be used as the film thickness characteristic to be referred to at this time.

When obtaining the film thicknesses at the individual positions on the substrate, the computer 7 shows the measurement result of the film thickness on the display device 8. The display function may be appropriately determined by design. For example, an appropriate range of the film thickness may be registered in advance, and only regions in which the film thickness is out of the appropriate range may be colored and displayed in a two-dimensional image of the substrate W. Alternatively, the film thicknesses may be classified into several levels, and the individual classes may be displayed with different colors.

Based on the measurement result of this film thickness distribution, all microcrystalline silicon films formed by a plasma CVD apparatus can be judged good or bad, and when defects are detected, defective substrates can be removed from the production line; hence, whenever necessary, film formation conditions of the plasma CVD apparatus can be adjusted. In addition, when the film formation becomes defective due to trouble which cannot be sensed by the plasma CVD apparatus itself, the cause thereof can be immediately determined, and quick corrective measures can be taken. That is, by performing the evaluation relative to the average film thickness and the standard value of the film thickness distribution, which are the items to be controlled, and by monitoring the film formation status online, production conditions showing high power generation efficiency can be maintained, and the occurrence of defects can be detected within a very short period of time; hence stable film formation quality is achieved and the yield is improved. Accordingly, the production efficiency is improved.

As described above, according to the film thickness measurement apparatus of this embodiment, by preparing a plurality of samples having different film thicknesses and crystallinities, more particularly, Raman peak intensity ratios, and irradiating these samples with illumination light having different wavelengths, the light transmitted through each sample when irradiated with the light of each wavelength is detected, so that the transmission spectra are measured. Next, based on the measurement results, since the film thickness characteristic for each crystallinity, showing the relationship between the transmittance and the film thickness, is formed at each wavelength, and a wavelength at which the measurement difference ΔW of the transmittance caused by the crystallinity is within a predetermined range is selected among the film thickness characteristics, light having a wavelength at which the measurement error caused by the crystallinity is small can be selected. In addition, since the film thickness measurement is performed using the wavelength thus selected, the film thickness measurement error can be reduced.

In the above embodiment, the substrate W is irradiated with a plurality of illumination light beams arranged in a line, having only a wavelength which is only used for measurement in advance, that is, with single-wavelength illumination light beams from LEDs or the like, and the transmittances of transmitted light beams are obtained from voltage values of a plurality of photodiodes disposed in a line so as to correspond to the LEDs, so that the film thicknesses are measured by using these transmittances. Since the voltage value is set to 100% when the substrate W is not provided, the transmittance can be obtained from an indicated voltage value. As described above, by using illumination light beams having only a wavelength used for measurement in advance, a film thickness measurement apparatus in which the transmittance is obtained at a desired wavelength can be easily constructed at low cost.

In addition, instead of the method described above, the film thickness may be measured in such a way that the substrate W is irradiated with white light, the light intensity of its dispersed transmitted light is obtained, and the film thickness is measured by using the transmittance at a predetermined wavelength based on this dispersed light intensity. In this case, since the wavelength of light whose transmission amount is to be evaluated can be freely selected, selection of a test film can be easily performed. Furthermore, when the film thickness characteristic showing the relationship between the transmittance and the film thickness of each sample is formed at each wavelength, a film thickness measurement apparatus provided in a production line can be used.

Furthermore, although light is emitted in a line in the above embodiment, the film thickness may be measured and evaluated only at a predetermined position by point light emission.

SECOND EMBODIMENT

Next, a film thickness measurement apparatus according to a second embodiment of the present invention will be described.

In the film thickness measurement of a thin film, besides the crystallinity described above, the measurement error is caused by surface irregularities of the thin film. Accordingly, in order to reduce the measurement error caused by surface irregularities, the wavelength of illumination light is selected.

In this embodiment, a plurality of samples having different thicknesses and different degrees of surface irregularity is prepared. In order to evaluate the degree of surface irregularity of a microcrystalline silicon film, a haze ratio is used. The haze ratio is represented by diffused transmitted light/total transmitted light and is measured, for example, by a known haze meter (such as HR-100 manufactured by Murakami Color Research Laboratory, in accordance with ASTM D-1003).

The surface irregularity of the microcrystalline silicon film is substantially influenced by surface irregularity of a transparent conductive film (TCO) provided as an underlying layer for the microcrystalline silicon film. Accordingly, in this embodiment, the degree of surface irregularity of the microcrystalline silicon film is indirectly varied by varying the irregularity of the transparent conductive film.

That is, in this embodiment, microcrystalline silicon films having different thicknesses are further formed on transparent conductive films having different irregularities, so that a plurality of samples having different surface irregularities and different film thicknesses is formed. In this case, the thickness of the microcrystalline silicon film is varied at predetermined thickness intervals, for example, in the range from dmin to dmax, which is assumed as an actual measurement range.

In addition, for the surface irregularity, for example, two types of transparent conductive films having a low and a high haze ratio are prepared.

Next, these samples are each irradiated with white light in a manner similar to that of the first embodiment described above, transmitted light thereof is detected, and the transmission spectra are measured from the transmitted light. Accordingly, the transmittances of each sample at the wavelengths λ1 to λ5 are obtained. These transmittances are plotted on the vertical axis, and the film thicknesses are plotted on the horizontal axis, as shown in FIG. 5, so that film thickness characteristics related to each film quality at the wavelengths λ1 to λ5 are obtained.

Figure 5:
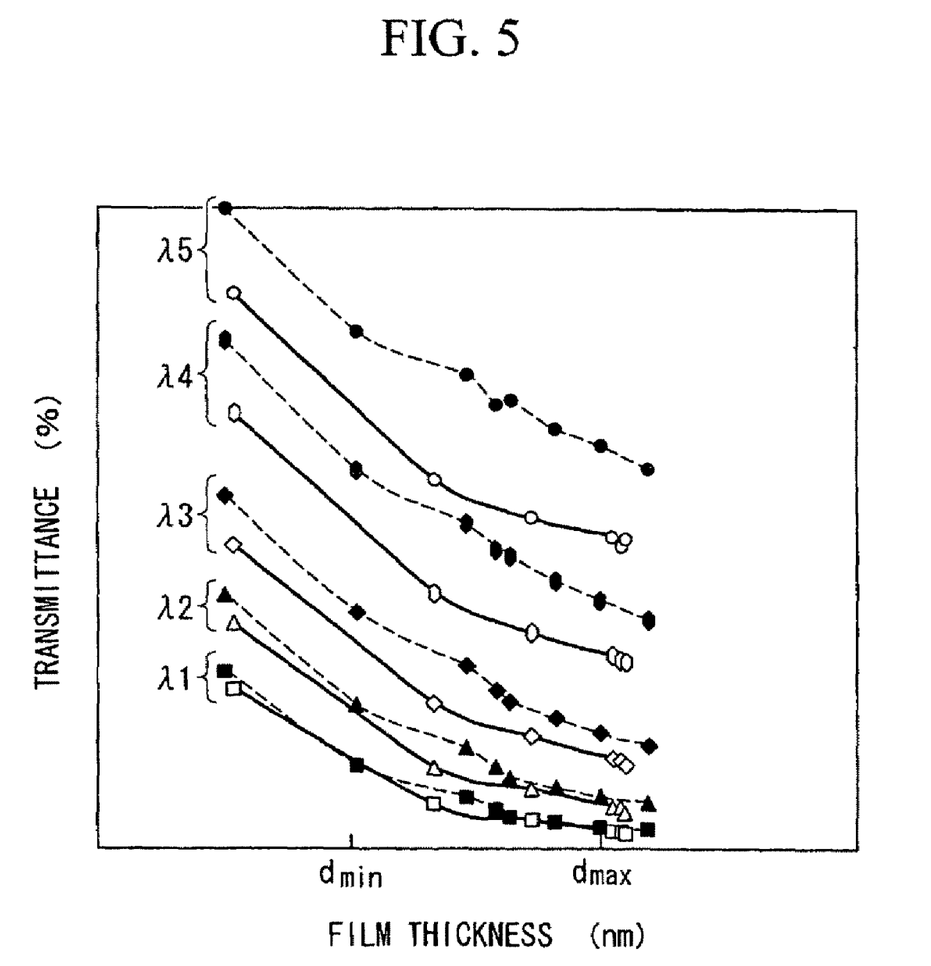
FIG. 5 is a view showing one example of film thickness characteristics at individual wavelengths when surface irregularities of thin films are different from each other.

In FIG. 5, dotted lines indicate the film thickness characteristics at the wavelengths λ1 to λ5 obtained when the haze ratio is low, and solid lines indicate the film thickness characteristics at the wavelengths λ1 to λ5 obtained when the haze ratio is high.

Subsequently, among the film thickness characteristics at the wavelengths λ1 to λ5 shown in FIG. 5, in the thickness range from dmin to dmax assumed as an actual measurement range, a wavelength at which the film thickness characteristic does not fluctuate but gradually varies and at which the measurement difference related to the variation in haze ratio is within a predetermined range is selected. That is, a wavelength having a small dependence on the haze ratio is selected. Furthermore, a transmittance that decreases monotonically and sharply with an increase in thickness in the measurement range is preferable. In addition, when the film thickness measurement is performed, the substrate W is irradiated with illumination light including light having a selected wavelength, and the transmittance at the above wavelength is further obtained, so that the film thickness is measured based on this transmittance.

As has thus been described, according to this embodiment, by preparing a plurality of thin-film samples that include transparent conductive films having different surface conditions, that is, microcrystalline silicon films having different surface conditions, and different thicknesses, and by irradiating the samples with illumination light having different wavelengths, the light transmitted through the samples when irradiated with the light of each wavelength is detected, so that the transmission spectra are measured. Based on the measurement results, the film thickness characteristics showing the relationship between the transmittance and the film thickness for each surface condition are formed at each wavelength, and in each film thickness characteristic, a wavelength at which the measurement difference in transmittance caused by the surface condition is within a predetermined range is selected; hence, a wavelength at which the measurement error caused by the surface condition of a thin film is small can be selected.

Subsequently, the film thickness measurement is performed using light having the wavelength thus selected, and hence the film thickness measurement error can be reduced.

In the embodiment described above, when the sample is formed, the surface condition of the microcrystalline silicon film is indirectly varied by varying the surface condition of the transparent conductive film; however, instead of the method described above, a plurality of samples having different haze ratios may be formed by directly varying the surface conditions of microcrystalline silicon films.

In addition, it was found from investigation that the measurement error caused by the surface condition of the thin film is larger than that caused by the difference in film quality of a microcrystalline silicon film due to the crystallinity described above. Hence, the film thickness measured by the above method may be corrected by using the haze ratio. As described above, when the film thickness measurement value is corrected based on the haze ratio, the measurement accuracy can be further improved.

As for the correction based on the haze ratio, for example, it is possible to use a method in which a correction function using the haze ratio and the film thickness as parameters is stored in the memory device of the computer 7, and the measured film thickness and haze ratio are input to this correction function so as to perform the correction. In addition, it is also possible to use a method in which calibration characteristics in which the film thickness characteristics are memorized at individual haze ratios are stored in the memory device of the computer 7, and the film thickness is obtained by using the film thickness characteristic in accordance with the haze ratio of the microcrystalline silicon film. In this case, the haze ratio may be provided independently of the film thickness measurement apparatus in a solar cell production line, and the measurement result may be sent to the computer in an online manner. A result measured by a separate apparatus provided independently of the production line may be sent to the computer.

The invention claimed is:

1. A wavelength selection method for selecting a wavelength to be used for film thickness measurement of a thin film, comprising:
   radiating illumination light having different wavelengths onto a plurality of samples in which thin films having different film qualities and film thicknesses are formed on substrates;
   measuring evaluation values related to the amounts of transmitted light when the illumination light of each wavelength is radiated;
   based on the measurement results, forming film thickness characteristics showing the relationship between the evaluation values and the film thicknesses for each film quality at each wavelength; and
   among the film thickness characteristics, selecting a wavelength at which a measurement difference between the evaluation values due to the film qualities is within a predetermined range.

2. The wavelength selection method according to claim 1, wherein the film qualities include the crystallinity.

3. The wavelength selection method according to claim 2, wherein the film qualities include surface irregularities of the thin films.

4. The wavelength selection method according to claim 1, wherein the film qualities include surface irregularities of the thin films.

5. A film thickness measurement method comprising:
   radiating illumination light including a wavelength selected by the wavelength selection method according to claim 1 onto a substrate which is provided with a thin film and which is transported in a production line including a thin-film formation process;
   detecting light transmitted through the substrate;
   measuring the evaluation value at the wavelength based on the intensity of the detected light; and
   obtaining the film thickness corresponding to the measured evaluation value using a film thickness characteristic at the wavelength in which evaluation values and film thicknesses are related to each other in advance.

6. The film thickness measurement method according to claim 5, further comprising:
   measuring a haze ratio of the thin film with another device; and
   correcting the measured film thickness based on the measured haze ratio.

7. A film thickness measurement apparatus comprising:
   a light radiation unit radiating illumination light of a certain wavelength or illumination light including the certain wavelength onto a substrate that is provided with a thin film and that is transported in a production line including a thin-film formation process;
   a light detection unit detecting light transmitted through the substrate;
   an evaluation value measurement unit measuring the evaluation value at the certain wavelength based on the intensity of the detected light; and
   a film thickness measurement unit obtaining a film thickness corresponding to the measured evaluation value using a film thickness characteristic at the wavelength, evaluation values and film thicknesses being related to each other in advance in the film thickness characteristic,
   wherein the film thickness measurement apparatus includes device for:
      radiating illumination light having different wavelengths onto a plurality of samples in which thin films having different film qualities and film thicknesses are formed on substrates;
      measuring evaluation values related to the amounts of transmitted light when the illumination light of each wavelength is radiated;
      based on the measurement results, forming film thickness characteristics showing the relationship between the evaluation values and the film thicknesses for each film quality at each wavelength; and
      among the film thickness characteristics, selecting as the certain wavelength a wavelength at which a measurement difference between the evaluation values due to the film qualities is within a predetermined range.

8. A system for producing a thin film silicon device comprising: the film thickness measurement apparatus according to claim 7, wherein the film thickness measurement apparatus is provided in a production line including a thin-film formation process to monitor a thin-film formation status.

9. The film thickness measurement apparatus according to claim 7, wherein the film qualities include the crystallinity.

10. The film thickness measurement apparatus according to claim 9, wherein the film qualities include surface irregularities of the thin films.

11. A system for producing a thin film silicon device comprising: the film thickness measurement apparatus according to claim 10, wherein the film thickness measurement apparatus is provided in a production line including a thin-film formation process to monitor a thin-film formation status.

12. A system for producing a thin film silicon device comprising: the film thickness measurement apparatus according to claim 9, wherein the film thickness measurement apparatus is provided in a production line including a thin-film formation process to monitor a thin-film formation status.

13. The film thickness measurement apparatus according to claim 7, wherein the film qualities include surface irregularities of the thin films.

14. A system for producing a thin film silicon device comprising: the film thickness measurement apparatus according to claim 13, wherein the film thickness measurement apparatus is provided in a production line including a thin-film formation process to monitor a thin-film formation status.

* * * * *

UNITED STATES PATENT AND TRADEMARK OFFICE
CERTIFICATE OF CORRECTION

PATENT NO. : 7,755,777 B2  Page 1 of 1
APPLICATION NO. : 12/517122
DATED : July 13, 2010
INVENTOR(S) : Sakai et al.

It is certified that error appears in the above-identified patent and that said Letters Patent is hereby corrected as shown below:

On the title page, the names of the inventors should read as follows:

Item (75) Inventors: Satoshi Sakai, Kanagawa (JP); Masami Iida, Nagasaki (JP); Kohei Kawazoe, Nagasaki (JP)

Signed and Sealed this

Fourteenth Day of December, 2010

David J. Kappos
*Director of the United States Patent and Trademark Office*